(12) United States Patent
Ledet

(10) Patent No.: US 9,801,047 B1
(45) Date of Patent: *Oct. 24, 2017

(54) WIRELESS DEVICE APPLICATION INTERACTION VIA EXTERNAL CONTROL DETECTION

(71) Applicant: OPEN INVENTION NETWORK LLC, Durham, NC (US)

(72) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,316

(22) Filed: Aug. 16, 2016

Related U.S. Application Data

(63) Continuation of application No. 14/699,646, filed on Apr. 29, 2015, now Pat. No. 9,420,452, which is a continuation of application No. 13/851,382, filed on Mar. 27, 2013, now Pat. No. 9,037,124.

(51) Int. Cl.
| | |
|---|---|
| *H04M 3/00* | (2006.01) |
| *H04W 8/22* | (2009.01) |
| *H04M 1/725* | (2006.01) |
| *H04W 4/02* | (2009.01) |

(52) U.S. Cl.
CPC ......... *H04W 8/22* (2013.01); *H04M 1/72569* (2013.01); *H04W 4/023* (2013.01)

(58) Field of Classification Search
CPC ............................. H04W 8/22; H04M 1/72569
USPC ....................................................... 455/418
See application file for complete search history.

(56) References Cited

U.S. PATENT DOCUMENTS

| | | | | |
|---|---|---|---|---|
| 8,194,926 B1* | 6/2012 | Keysers | ............... | G06F 3/0487 382/103 |
| 8,532,675 B1* | 9/2013 | Pasquero | .......... | H04M 1/72572 345/158 |
| 8,577,422 B1* | 11/2013 | Ledet | ...................... | G06F 3/011 345/173 |
| 8,792,944 B1* | 7/2014 | Ledet | ...................... | G06F 3/011 345/173 |
| 2004/0127198 A1* | 7/2004 | Roskind | ............ | H04M 1/72566 455/412.2 |
| 2008/0158180 A1* | 7/2008 | Krah | ................... | G06F 3/03545 345/173 |
| 2009/0303204 A1* | 12/2009 | Nasiri | ..................... | A63F 13/06 345/184 |
| 2010/0214216 A1* | 8/2010 | Nasiri | ..................... | A63F 13/06 345/158 |

(Continued)

*Primary Examiner* — Nathan Taylor
(74) *Attorney, Agent, or Firm* — Haynes and Boone, LLP

(57) ABSTRACT

Wireless device application interaction via external control detection comprises identifying a first position of a wireless device and identifying a first change in the wireless device's position. The method may also provide calculating a first distance vector. The method may also perform comparing the first distance vector to a first threshold distance and calculating a second distance vector based on a distance between the second position and a third position and comparing the second distance vector to a second threshold distance, and changing a current operating state of the wireless device to a different operating state if the first distance vector exceeds the first minimum distance and the second distance vector does not exceed the first maximum distance.

20 Claims, 15 Drawing Sheets

(56) References Cited

U.S. PATENT DOCUMENTS

| | | | |
|---|---|---|---|
| 2011/0148752 A1* | 6/2011 | Alameh | G06F 1/1694 345/156 |
| 2011/0163955 A1* | 7/2011 | Nasiri | A63F 13/06 345/158 |
| 2012/0038652 A1* | 2/2012 | Yang | G06F 1/1694 345/467 |
| 2013/0002602 A1* | 1/2013 | Apelbaum | H04M 1/72547 345/174 |
| 2013/0194066 A1* | 8/2013 | Rahman | G05B 1/01 340/5.51 |
| 2013/0265225 A1* | 10/2013 | Nasiri | A63F 13/06 345/156 |
| 2013/0344862 A1* | 12/2013 | Alameh | G06F 1/1694 455/418 |
| 2014/0199987 A1* | 7/2014 | Wright | H04W 4/02 455/419 |

* cited by examiner

```php
<?php
include_once("config.php");
if ($fbuser) {
    try {
        //Get user pages details using Facebook Query Language (FQL)
        $fql_query = "SELECT page_id, name, page_url FROM page WHERE page_id IN (SELECT page_id
        $postResults = $facebook ->api(array( 'method' => 'fql.query', 'query' => $fql_query ));
    } catch (FacebookApiException $e) {
        echo $e->getMessage();
    }
}else{
    //Show login button for guest users
    $loginUrl = $facebook->getLoginUrl(array('redirect_url'=>$homeurl, 'scope'=>$fbPermission
    echo '<a href="'.$loginUrl.'"><img src="images/facebook-login.png" border="0"></a>' ;
} if($fbuser && empty($postResults))
{
    /*
    if user is logged in but FQL is not returning any pages, we need to make sure user does
    OR "manage_pages" permissions isn't granted yet by the user.
    Let's give user an option to grant application permission again.
    */
    $loginUrl = $facebook->getLoginUrl(array('redirect_url'=>$homeurl,"scope" =>$fbPermission
    echo 'Could not get your page details, make sure you have created one!';
    echo '<a href="'.$loginUrl.'">Click here to try again!</a>';
}elseif($fbuser && !empty($postResults)){
```

FROM FIG. 5

```
//Everything looks good, show message form.
?>
<html>
<head>
<meta http-equiv="Content-Type" content="text/html; charset=utf-8" />
<title>Post to Facebook Page Wall Demo</title>
<link href="style.css" rel="stylesheet" type="text/css" />
</head>
<body>
<div class="fbpagewrapper">
<div id="fbpageform" class="pageform">
<form id="form" name="form" method="post" action="process.php">
<h1>Post to Facebook Page Wall</h1>
<p>Choose a page to post!</p>
<label>Pages
<span class="small">Select a Page</span>
</label>
<select name="userpagaes" id="upages">
<?php
foreach ($postResults as $postResult) {
    echo '<option value="'.$postResult["page_id"].'">'.$postResult["name"].'</option>';
}
?>
```

</select>
<label>Message
<span class="small">Write something to post!</span>
</label>
<textarea name="message"></textarea>
<button type="submit" class="button" id="submit_button">Send Message</button>
<div class="spacer"></div>
</form>
</div>
</div>
</body>
</html>
<?php
}
?>
</body>
</html>
```

FIG. 5
CONTINUED

```
static BOOL L0AccelerationIsShaking(UIAcceleration* last, UIAcceleration* current, double threshold) {
        double
                deltaX = fabs(last.x - current.x),
                deltaY = fabs(last.y - current.y),
                deltaZ = fabs(last.z - current.z);

return
                (deltaX > threshold && deltaY > threshold) ||
                (deltaX > threshold && deltaZ > threshold) ||
                (deltaY > threshold && deltaZ > threshold);
}
@interface L0AppDelegate : NSObject <UIApplicationDelegate> {
        BOOL histeresisExcited;
        UIAcceleration* lastAcceleration;
}
@property(retain) UIAcceleration* lastAcceleration;
@end
@implementation L0AppDelegate

- (void)applicationDidFinishLaunching:(UIApplication *)application {
        [UIAccelerometer sharedAccelerometer].delegate = self;
}

- (void) accelerometer:(UIAccelerometer *)accelerometer didAccelerate:(UIAcceleration *)acceleration { if (self.lastAcceleration) {
                if (!histeresisExcited && L0AccelerationIsShaking(self.lastAcceleration, acceleration, 0.7)) {
                        histeresisExcited = YES;

/* The user has performed the shaking action successfully */

} else if (histeresisExcited && !L0AccelerationIsShaking(self.lastAcceleration, acceleration, 0.2)) {
                        histeresisExcited = NO;
                }
        } self.lastAcceleration = acceleration;
}

@end
```

FIG. 7

WIRELESS DEVICE APPLICATION INTERACTION VIA EXTERNAL CONTROL DETECTION

CROSS-REFERENCE TO RELATED APPLICATIONS

The present application is a continuation of U.S. patent application Ser. No. 14/699,646, filed on Apr. 29, 2015, entitled WIRELESS DEVICE APPLICATION INTERACTION VIA EXTERNAL CONTROL DETECTION, issued as U.S. Pat. No. 9,420,452 on Aug. 16, 2016, which is a continuation of U.S. patent application Ser. No. 13/851,382, filed on Mar. 27, 2013, entitled WIRELESS DEVICE APPLICATION INTERACTION VIA EXTERNAL CONTROL DETECTION, issued as U.S. Pat. No. 9,037,124 on May 19, 2015, which is incorporated by reference herein in their entirety.

TECHNICAL FIELD OF THE APPLICATION

This application relates to wireless device application interaction via external control detection.

BACKGROUND OF THE APPLICATION

Conventionally, wireless device are operated by pressing buttons and initiating acceptance messages prior to initiating a particular action or function (e.g., sending a call, accepting a call, generating a message, etc.). When in a meeting or otherwise attending an event that requires silence or some degree of discretion, it is usually necessary to avoid any incoming messages/texts/emails until after the engagement is completed. At that point after the meeting has ended, it is customary to review all of the incoming data messages and attend to each item separately. In the event that multiple items were received from a single contact, each of the items needs to be attended to separately and many of the received items could be from separate communication standards (e.g., voicemail, email, short message service (SMS) text messages, etc.). Additionally, the way a user interacts with their smart phone or wireless device when answering calls, emails, messages, etc., may require extra time to select or deny options and navigate from one message to the next message.

As mobile devices have become increasingly optimal and intelligent, users have come to expect more and more functionality inherent in their respective mobile devices. With the increased memory included in such devices, an expected functionality is the storage and easy playback of a user's music collection. "Mobile Music" is music that is downloaded or streamed to a mobile device and played on the same mobile device. Currently, there are various different applications permitting for the storage and playback of music on mobile devices. These same mobile devices are primarily phones for receiving and placing voice calls over the cellular network. With the current mobile devices, new functionality can be introduced to take advantage of the device's sensor data as well as the touch screen's on current mobile devices otherwise known in the market as "smartphones". Applications executing on these devices can monitor data from the device's sensor data, for example, the accelerometer as well as the touch screens. These interactions allow for more intuitive applications truly bring to light the meaning of a "smartphone".

SUMMARY OF THE APPLICATION

One embodiment of the present application may include a method including identifying a first position of a wireless device based on a sensor reading of at least one sensor operating as part of the wireless device, storing first position data corresponding to the first position in a memory, identifying a first change in the wireless device's position to a second position that is different from the first position, storing second position data corresponding to the second position in the memory, calculating a first distance vector based on a distance between the first position of the wireless device and the second position of the wireless device, the distance vector having a corresponding first direction associated with a first direction of movement of the wireless device, comparing the first distance vector to a first threshold distance stored in the memory to confirm the first distance vector exceeds a first minimum distance, identifying a second change in the wireless device's position to a third position that is different from the first position and the second position, storing third position data corresponding to the third position in the memory, calculating a second distance vector based on a distance between the second position of the wireless device and the third position of the wireless device, the second distance vector having a corresponding second direction associated with a second direction of movement of the wireless device, comparing the second distance vector to a second threshold distance stored in the memory to confirm the second distance vector does not exceed a first maximum distance, and changing a current operating state of the wireless device to a different operating state if the first distance vector exceeds the first minimum distance and the second distance vector does not exceed the first maximum distance.

Another example embodiment of the present application may include a wireless device that includes at least one sensor, a memory and a processor. The processor may be configured to identify a first position of the wireless device based on a sensor reading of the at least one sensor operating as part of the wireless device, store first position data corresponding to the first position in the memory, identify a first change in the wireless device's position to a second position that is different from the first position, store second position data corresponding to the second position in the memory, calculate a first distance vector based on a distance between the first position of the wireless device and the second position of the wireless device, the distance vector having a corresponding first direction associated with a first direction of movement of the wireless device, compare the first distance vector to a first threshold distance stored in the memory to confirm the first distance vector exceeds a first minimum distance, identify a second change in the wireless device's position to a third position that is different from the first position and the second position, store third position data corresponding to the third position in the memory, calculate a second distance vector based on a distance between the second position of the wireless device and the third position of the wireless device, the second distance vector having a corresponding second direction associated with a second direction of movement of the wireless device, compare the second distance vector to a second threshold distance stored in the memory to confirm the second distance vector does not exceed a first maximum distance, and change a current operating state of the wireless device to a different operating state if the first distance vector exceeds the first minimum distance and the second distance vector does not exceed the first maximum distance.

BRIEF DESCRIPTION OF THE DRAWINGS

FIG. 5 illustrates an example computer code for posting content to a social networking website.

FIG. 7 illustrates an example computer code used to identify movement and gyroscope data, according to example embodiments.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments of the present application provide an application for a device that adds functionality to a user's computing device (e.g., a wireless mobile device), which permits intuitive interactions between a remote Internet source and the mobile device. In one example, functionality is added to the user's mobile device allowing for easy integration with a media application, such as a music application. Also, the device's sensor and/or touch screen data are utilized to bring new interaction with the mobile device when the user initiates a call answering pattern of movements or actions.

Figure 1:
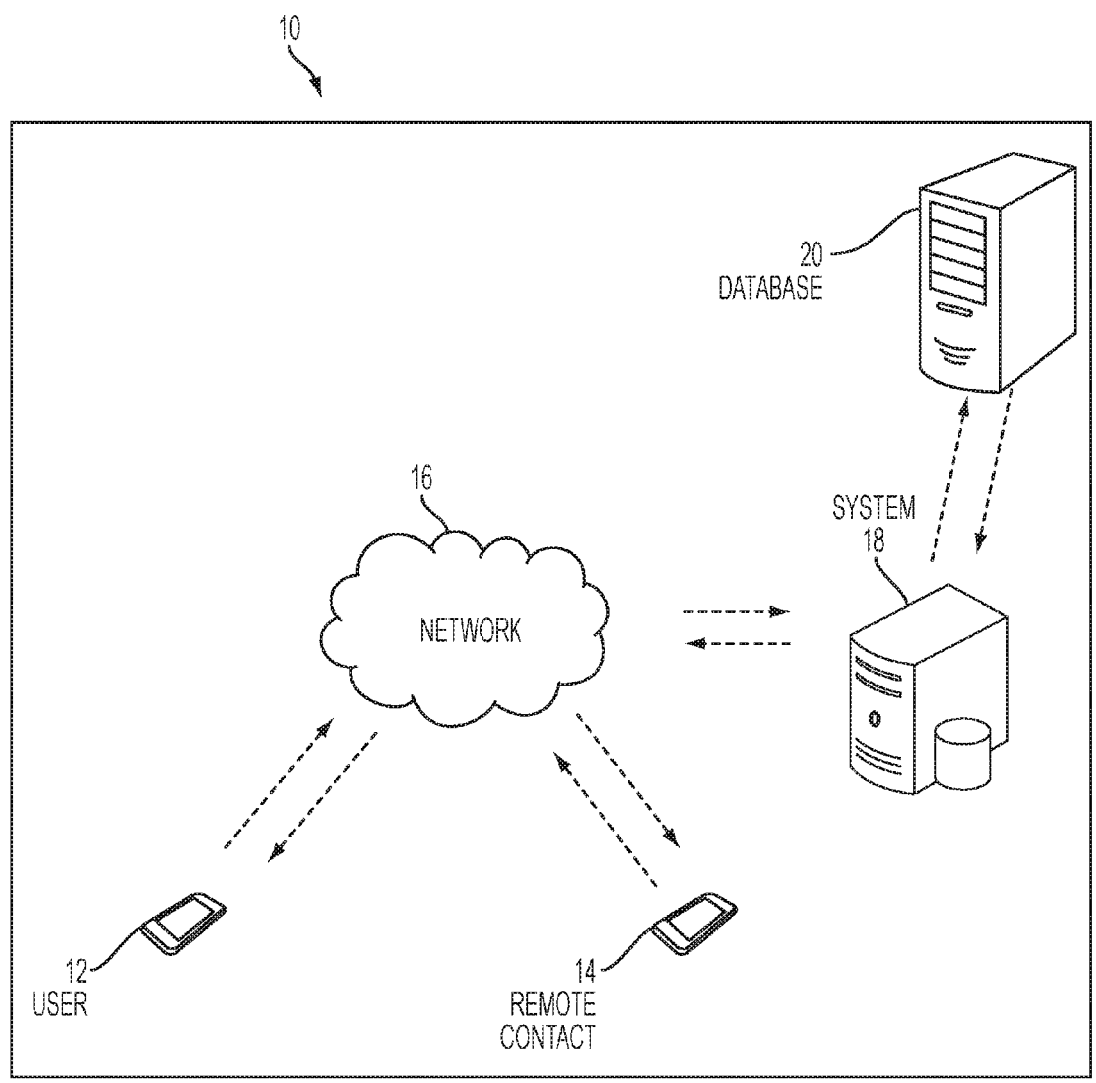
FIG. 1 illustrates an example communication network that supports wireless device communication operations, according to example embodiments.

FIG. 1 illustrates a system diagram of a communication network. Referring to FIG. 1, the communication network permits a user utilizing a client device (i.e., wireless device or mobile station—hereinafter used interchangeably) 12 to access an application in the form of software, for example, to be downloaded from the databank system 18 or that currently resides on the client's device 12. The client device 12 can be any of a mobile laptop device and/or a personal desktop computer or a mobile device, smartphone, tablet computing device, etc. The computing device 12 is connected to the network 16, which may include the Internet, the cloud, etc. It should be noted that other types of devices, in addition to devices 12 and 14, might also be used. For example, a personal digital assistant (PDA), a tablet computer, a laptop, an MP3 player, a gaming device, such as a hand held system or home based system, and the like including a PC or other wired device that can also transmit and receive information could be used with the present example embodiments.

The user may interface through the client device 12 and connect through the network 16 to the computer system 18. The system 18 can be redundant or may be more than a single entity without deviating from the scope of the application. One or more remote contacts 14 also exist and interact with the system 18 through the network 16. The remote contact device 14 can be any of a mobile laptop device and/or a personal desktop computer or a mobile device. The remote contact-computing device 14 may be connected to the network 16. It should be noted that other types of devices, in addition to devices 14, might be used with the present application. For example, a PDA, a tablet computer, a laptop, an MP3 player, a gaming device (such as a hand held system or home based system) and the like (including a P.C. or other wired device) that can also transmit and receive information could be used with the present application.

An offsite or cloud-based database 20 may also be part of the network 10 and can be directly connected to the system 18, or may be remotely connected through the network 16 without deviating from the scope of the present application. In an example embodiment of the present application, filtered data, media data messages, etc., may be received on behalf of the user's mobile station account, email address, phone number, etc., and may be stored in the system 18 and/or the database 20 (e.g., home location register HLR, base transceiver station (BTS)) in lieu of the application executing on the user's device 12.

The application may reside on the user's device 12 which can be a mobile station, but can also reside on a user's desktop computer, a personal digital assistant (PDA), tablet computer, or any other device containing a processor, memory, and an operating system. If the application resides on a mobile device, the application may be downloaded through a communication platform, such as an application store or market residing on the device or accessed remotely via the device. The current application can work with any device, such as a personal computer with a touch screen, a laptop with a touch screen, a personal computing tablet, a smartphone or any device with a processor, memory and a touch screen.

In an embodiment of the present application, the functionality of a "More" option, button and/or "More" area is utilized to interact with other applications. In this example, the "More" button/area is overlaid over other applications that the user is executing on the mobile device allowing the functionality surrounding the interactions between the user's device 12 and the system 18 in other intuitive areas. The "More" option can be implemented as either a button component, or an area allowing for functionality when another component is dragged into the area by a user initiated selection operation.

Figure 2:
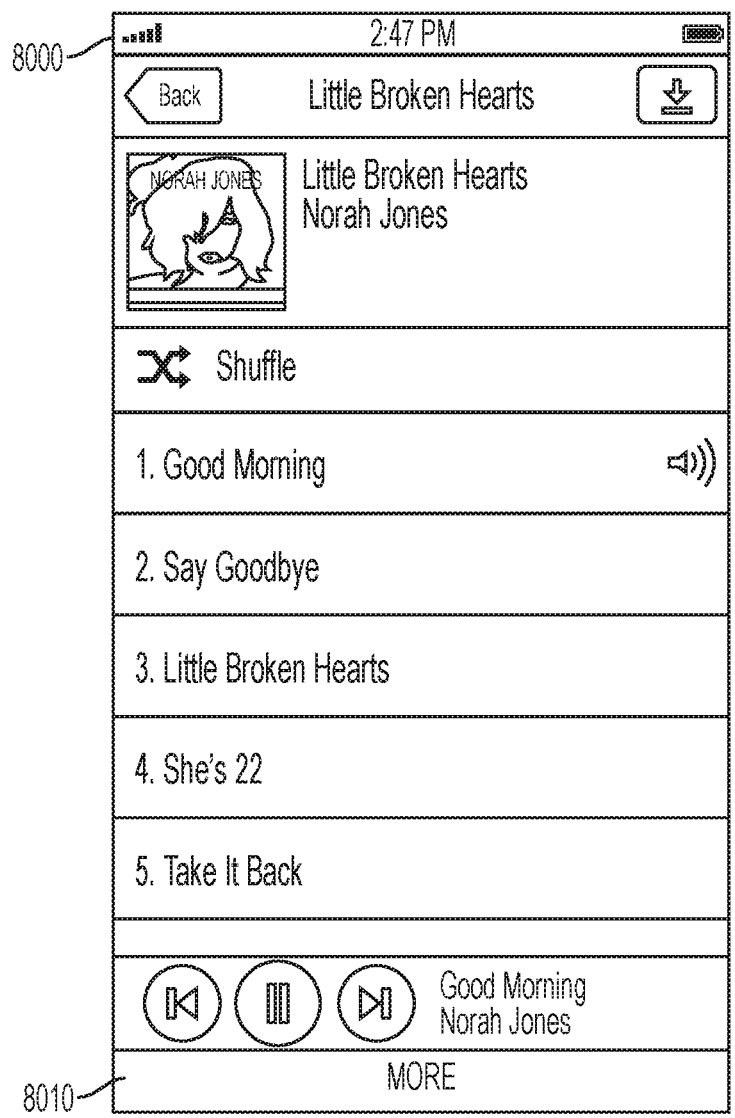
FIG. 2 illustrates an example user interface for accessing a user application, according to example embodiments.

FIG. 2 illustrates an example user interface for making selections with a music application according to example embodiments. Referring to FIG. 2, the user interface 8000 is a snapshot of a user's mobile device or smartphone display screen providing options to the user of the mobile device. As one example, the user is listening to music on the mobile device. With the application executing, a "More" area 8010 is present on the device allowing any item on the screen to be selected and then moved to a certain area for a result. This action initiates functionality as depicted below. The functionality can be interaction between the mobile device and the network 16, and/or the mobile device and the system 18. The user is playing a song by "Norah Jones" entitled "Good Morning" from an album entitled "Little Broken Hearts". The "More" option is located at the bottom of the display which slightly reduces the real estate display area of the music player and corresponding information on display area 8000.

Figure 3:
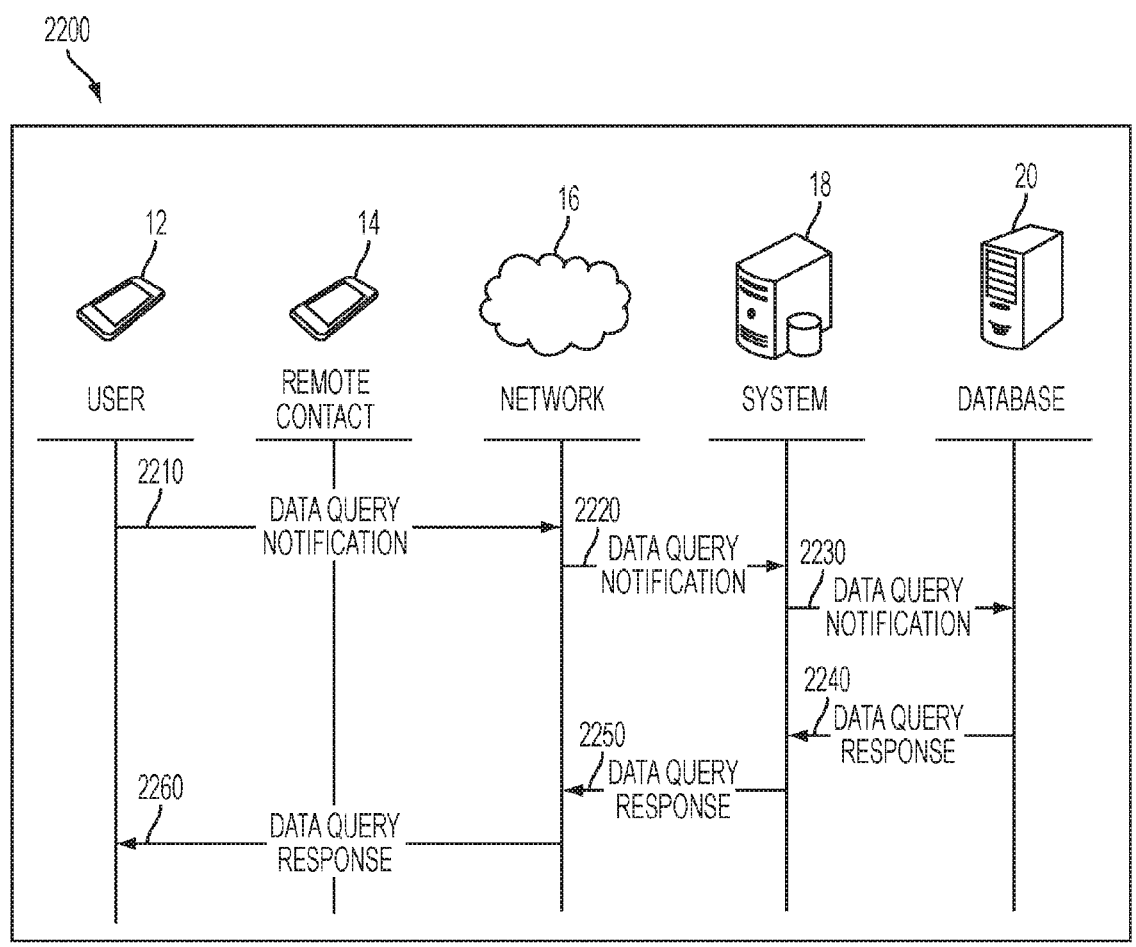
FIG. 3 illustrates an example communication signaling diagram of a message flow through the various computing devices and corresponding networks, according to example embodiments.

In response to the selection operation, the application may then send a data query notification message to the system 18 through the network 16 (see FIG. 3). For example, the query may include certain text: "Nora Jones; Little Broken Hearts; Good Morning"; Speech-to-Text: "Find similar types of music". As a result, the application, having received only the text of the song selected from the user 12, determines through the music application the name of the artist and the album of the song and sends this to the system 18. This additional information is easily obtainable through the music application executing on the user's mobile device 12.

The system 18 may receive the data query notification message which contains the two elements identified above, and may in turn query the music database(s). The database 20 may return music details (e.g., artist, songs, etc.) related to the query back to the system 18. This data is returned to the user's mobile device 12, and the application operating on the mobile device displays the results to the user 12.

FIG. 3 illustrates a message flow signaling diagram 2200 that depicts the flow of communication between the user's device 12, the system 18, and the potentially connected offsite database 20 (i.e., cloud service). In operation, when an object is dropped into the "More" area 8010 of FIG. 2, the application creates and sends a data query notification message 2210/2220/2230 to the system 18. This message is routed through the corresponding network 16. This message follows currently accepted formatting protocols normally utilized in intra-process communication (i.e. web services, the PHP protocol or any other currently accepted protocols, standards or mediums). The data query notification message is created by using the protocol that is agreed upon between the developer of the front end application executing on the user's device 12 and the system 18.

Upon reception of the message, the system 18 parses the message and if necessary, sends the message to the offsite database 20 to storage via message 2230. The database 20 can be a SQL database so the messages between the system 18 and the database 20 would be an agreed upon protocol, for example, web services protocols. The database 20 would then write the data into a table(s) stored in the database 20. The response to the data query notification message 2210/2220/2230 is the data query response message 2240/2250/2260, which contains the data from the system 18. This message is delivered to the user's mobile device 12 and is routed through the network 16.

According to another example, other elements, for example, images can be drug into the "More" area 8010. In this example, the user 12 selects the image of the cover art for the "Norah Jones" album being currently accessed by the user. The user places the selection device and/or finger over the image and presses it followed by a dragging operation of the image into the "More" screen area 8010. Next, the user releases the image which causes the application to accept the item/image and perform further processing.

In this example, the application of the current invention sends a data query notification message 2210/2220/2230 to the system 18 routed through the network 16. The system 18 would begin processing the received data in the data query notification message 2210/2220. Since the received data in this example was an image, the system 18 performs an image search to attempt to determine the meaning of the received image.

Image data on a website may contain metadata that will help the system 18 to understand the data that the user 12 has drug into the "More" 8010 area. This metadata is sent to the system 18 in the data query message 2210/2220. Metadata written into a photo file will identify who owns the data file, copyright information, contact information, the device utilized to capture the image and other information including keywords about the photo.

Figure 4:
FIG. 4 illustrates table of information corresponding to metadata of an image file, according to example embodiments.

FIG. 4 illustrates an example table 400 that includes metadata associated with and extracted from an image file. The system 18 parses this metadata and can use the 'Title', 'Description', 'Image Type', 'Format' as well as other fields in the metadata to ascertain the details of the image data. Using this information, music databases are queried to gather more detailed information related to the image data. This data is then sent back to the user in the data query response message 2250/2260 which is transmitted to the user's application on the mobile device 12.

The data query response message 2240/2250/2260 is sent from either the system 18 or the database 20 to the user's device 12. The message is routed through the network 16. Once received, the application's GUI is updated to display to the user the contents of the data query response message 2260. This functionality allows the user to easily receive data pertaining to a point of interest on the user's 12 mobile device screen.

In the above example, the application executing on the user's mobile device 12 can also be designed to perform all of the functionality without involving the system 18 or database 20 and without deviating from the scope of the current application.

According to another example embodiment, the system 18 can query the network 16 and perform an image search and compare results with the received image data. Once the related information of the image is determined, further processing can be performed. For example, online published databases exist that can be queried to obtain additional information regarding artists, such as music information, reviews, accompanying API of physical and digital products, venues, photos, participants, composers, lyrics, movements, labels, publishers and rights. The data from these and similar databases can populate a data query response message 2250/2260. Also, the application can create and populate its own database of both specific and general data that can be used to obtain data for future queries.

The system 18 begins to build the data query response message 2250/2260. The message may also be originated by the database 20 if necessary 2240. In the data query response message, the system 18, or database 20 includes particular information related to the image received. This information can include link(s), complete content or portions of a WIKIPEDIA page for the artist, the content of the artist's homepage, the artist's social media, tour information, venue locations and/or concert tickets that can be purchased for the artist, blogs related to the artist, album reviews of the artist, similar artists in terms of genre, beat tempo, music style, lyric content, etc., online merchants that offer media for sale by the artist, images of the artist, the lyrics from song or entire album of the artist, the full or partial discography of the artist, etc.

As another example, if the user simply desired additional information on the artist that is currently playing on the mobile device 8000, the user would select the artist name and then drag the highlighted text to the "More" area 8010. The application of the present application would then either query music databases directly through the network 16, or send a query message to the system 18 and receive a response that contains further information on the artist received from the music databases.

As another example, when the user is listening to a song on the mobile device, the user can click the song title or the album title and slide or move it to the "More" box 8010. The application checks the music library on the mobile device to determine if the user owns the song/album. If the user 12 does not own the song/album, the album displays a notification window on the user's mobile device 12. The notification (not depicted) asks the user if they want to purchase the song/album. The application can work with published APIs with popular music sites, such as Amazon.com to offer the ability for the user to purchase the song/album directly through the application.

Once the user purchases the song/album, the application then either manually through additional dialog windows or automatically allows the user 12 to update social networks that the user 12 is a member of to update what the user was listening and whether he or she purchased the song or album. The above example can also query the system 18 and/or database for obtaining the information in place of having the application perform all of the functionality without deviating from the scope of the current application.

As another example, the user may be viewing concert data on the device. The user via his or her device 12 then highlights concert data and moves/drags the text to the "More" area 8010. In this example, the application transmits the text to the user's 12 social networks along with the message: "If anyone is interested in attending this concert, let me know." This functionality is made possible through social networks published APIs allowing external applications to send messages directly to the particular social network. For example, using hypertext preprocessor (PHP), the example computer code 500 in FIG. 5 allows an application to post a message on the user's FACEBOOK wall.

Once receiving a page_id and message variables for in index_page, a select a page and send a POST request may be sent to PAGE_ID/feed with the permission of a publish_stream. This corresponding PHP script attempts to post the message to the selected user FACEBOOK page wall and displays a failure or success message. In another example embodiment of the current application, the application will also send out text messages to contacts that share an interest in the something that the user has performed in the application, such as purchased a song/album, an item through the application, book, electronics item, a concert ticket, etc. The availability of the user's contact list is made possible through authentication configured in the application.

The content of the text messages will be different for those that are geographically closer to the user 12 as he/she establishes a more intimate relationship with those individuals. The more detailed text message may add additional information, such as where they could meet, such as a local restaurant or bar. This information is gathered by the system through APIs published by programs such as GOOGLE Maps, or YELP or another program that lists the geographic location of establishments related to a given location.

In addition to allowing the user to drag items into the "More" area 8010, the application utilizes other functionality previously disclosed that provides a deeper level of intuitiveness to the interaction of the user and the application, such that as the user selects an item on the display of the mobile device and drags the item to the "More" area 8010, he/she may speak a command.

This additional interaction brings a new level of functionality to the application by allowing the user to "tell" the application specific information regarding the item that is being moved into the "More" area 8010. The user 12 can select the artist name, highlight it and then drag it into the "More" area 8010. While dragging, the user can say: "Concert dates for 2013". The application would then send the following data query notification message" Text: "Nora Jones"; Speech-to-Text: "Concert dates for 2013". The system 18 would then have an understanding of exactly what the user 12 desired.

By querying music databases, the system can obtain specific concert related data related to the user. The system can obtain the geographic location of the user through interfacing the location services on the mobile device. This accessibility is made possible through the authentication established when the user initiated the application. Knowing the user's location, the system can obtain specific concert dates where that artist is scheduled to be in or near the user's geographic location and return this data in the response message that is returned to the user's mobile device executing application.

Another example reflecting the ability for the user moving text or data to the "More" area 8010 while speaking provides the ability for the user 12 to select a song on the user's mobile device 12 then dragging the highlighted song to the "More" area 8010. While dragging the song "Good Morning", the user says: "Find similar types of music". As a result, the application would then send the following data query notification message to the system 18 through the network 16: Text: "Nora Jones; Little Broken Hearts; Good Morning"; Speech-to-Text: "Find similar types of music". The application, having received only the text of the song moved from the user, determines through the music application the name of the artist and the album of the song and sends this information to the system 18. This additional information is easily attainable through the music application executing on the user's mobile device 12.

The system 18, having received the data query notification message, queries the music database(s). The database returns music details (e.g., artist, songs, etc.) related to the query to the system 18. This data is returned to the user's mobile device 12 and the application running on the mobile device displays the results to the user 12. Many other examples can be thought of that allow the interaction of moving text to the "More" area 8010 while allowing speech. The examples included here are only a sample to depict the functional interaction and does not encompass the full range of possibilities. Other interactions can be implemented without deviating from the scope of the current application.

According to alternative embodiments of the present application, many mobile wireless devices include an accelerometer as a hardware sensor used to detect motion of the device in various directions. Applications operating on the device can utilize published functions that allow the monitoring of the accelerometer. For example, the 'onSensorChanged( )' event is triggered when the accelerometer experiences a change. By handling this event, the programmer can retrieve values and changed values from the accelerometer to functionally determine whether the device is moving side-to-side, moving upward, or moving downward. Also the rate and the delta time can be determined as well. Furthermore, when interfacing with the accelerometer, there are three values that are useful to know including 'X'=Roll. The 'X' value corresponds to a roll or rotation around the axis that extends from the home button to the earpiece of the mobile device. Values vary from 0.5 (rolled to the left) to −0.5 (rolled to the right). Another value is 'Y'=Pitch, which is the rotation around an imaginary line that runs from the top of the device to way down the screen. Values vary from 0.5 the top of the phone straight down to 0.5 (the top of the phone straight up). Another value is 'Z' Facedown/Face up. This value indicates whether the mobile device is face up (−0.5) or face down (0.5). When the device is placed on either of its sides, the value of Z is 0 (zero). Together, the X, Y, and Z values create a 3-D representation of an acceleration vector to indicate the direction of gravity working on the device.

Figure 6:
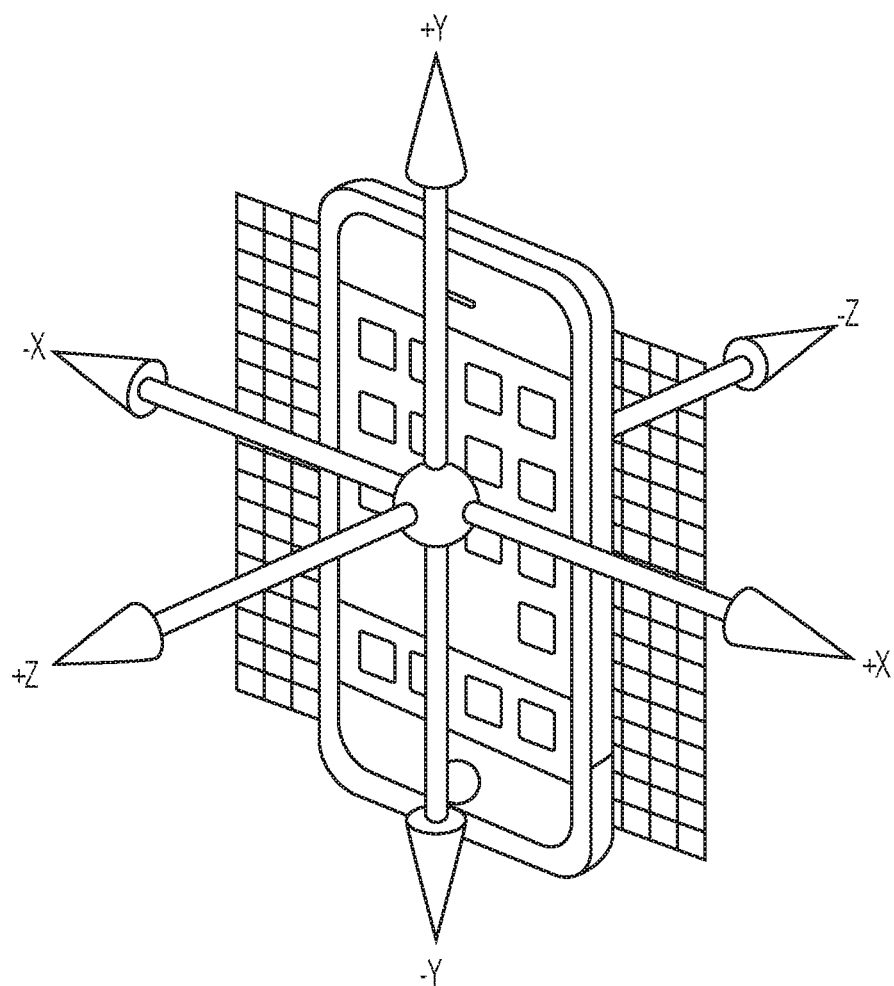
FIG. 6 illustrates an example gyroscope configuration for a wireless device, according to example embodiments.

FIG. 6 illustrates the X, Y and Z vectors of movement of the wireless device 600. By using the 'onSensorChanged( )' method (or a similar method), the programmer has the ability to determine the motion of the mobile device and allow the state of the executing program to execute accordingly. The bringing of the mobile device up to the face from a lower starting point triggers the device to understand that the user is raising the phone to speak. Consequently, lowering the phone from the face signifies to the mobile device that the user is no longer communicating. The use of the accelerometer threshold values is useful in determining, intuitively, the actions of the user. Furthermore, the use of monitoring threshold values of the mobile device can be programmatically designed to intuitively allow the application to change the state of the functionality once the user of the device learns the actions necessary to trigger the state change. For example, if the user raises and lowers the device within a period of time, the application executing on the mobile device can accept this alteration of the accelerometer threshold values as a state change and functionally perform as a different code path.

In a further embodiment of the current application, the user is able to perform a shaking of the phone to dictate a state change in the application. Programmatically, one implementation of this follows:

```
static BOOL L0AccelerationIsShaking(UIAcceleration* last,
UIAcceleration* current, double threshold) {
    double
        deltaX = fabs(last.x - current.x),
        deltaY = fabs(last.y - current.y),
        deltaZ = fabs(last.z - current.z);
    return
        (deltaX > threshold && deltaY > threshold) ||
        (deltaX > threshold && deltaZ > threshold) ||
        (deltaY > threshold && deltaZ > threshold);
}
@interface L0AppDelegate : NSObject <UIApplicationDelegate> {
    BOOL histeresisExcited;
    UIAcceleration* lastAcceleration;
}
@property(retain) UIAcceleration* lastAcceleration;
@end
@implementation L0AppDelegate
- (void)applicationDidFinishLaunching: (UIApplication
*)application {
    [UIAccelerometer sharedAccelerometer].delegate = self;
}
- (void) accelerometer:(UIAccelerometer *)accelerometer
didAccelerate:(UIAcceleration *)acceleration {
    if (self.lastAcceleration) {
        if (!histeresisExcited &&
L0AccelerationIsShaking(self.lastAcceleration, acceleration,
0.7)) {
            histeresisExcited = YES;
            /* The user has performed the shaking
action successfully */
        } else if (histeresisExcited &&
!L0AccelerationIsShaking(self.lastAcceleration, acceleration,
0.2)) {
            histeresisExcited = NO;
        }
    }
    self.lastAcceleration = acceleration;
}
@end.
```

In FIG. 7, the example computer code for detecting changes in the accelerometer is illustrated in detail. The hysteresis permits the program to prevent the shaking event from triggering multiple times until the user stops the shake. In this implementation, the coding of the state change to initiate a particular state change would take place in the commented line: /* The user has performed the shaking action successfully */. For example, the user 12 would have initiated an event where all songs are set in a playlist or a new song in the current playlist is started and the present song is skipped.

In another example embodiment of the present application, the user can shake the mobile device to enable other types of functionality in the application. For example, by shaking the mobile device, the application can be programmed to execute the application of the present application. Other commands can be programmed that allow various functionalities through the shaking of the device. Also, specific functionalities are performed to identify the movement of the device in a certain manner which is identified by the application, and depending on the movement of the device, additional functionalities are performed. For example, if the user tilts the top of the mobile device forward, changing the position of Y and Z axis', the application can perform a specific function.

According to example embodiments of the present invention, when a user desires to begin speaking into a mobile device, the device is normally brought to the side of the head and normally a slight ear press against the middle ear area is performed against at least a portion of the device. This ear press against the human ear is regular enough in normal mobile device users that it can be utilized among other executions to initiate the state change allowing for speech recognition (e.g., answering a call, etc.). This action is normally made by all users of mobile device and is seen as a normal physical action reflecting the user's desire to begin speaking and/or listening interactions with the mobile device.

The ear press may be recorded by the mobile device's sensors, which are commonly included in many smartphones. These sensors can include, but are not limited to: gyroscopes, accelerometers, compasses, etc. The action of a user moving the device up to the ear is distinguished enough to allow the device to ascertain with a relatively high amount of accuracy to switch to the speech state from a first state, such as an idle state, a ringing state, a standby state, etc.

In general, there are two expected actions occurring when a user brings the phone up to their ear. The first action is the raising of the phone or a movement of the phone from a first relative location to a second separate location ending with an abrupt stopping when the device reaches the ear. Another expected action is a small and slight bouncing effect when the phone reaches the ear against the touch screen surface of the mobile device. Focusing on the ear touch example, it is understood that this small bouncing effect is necessary for the user to feel that the device has been brought up to the ear area. In a rare condition, the user may stop the device without the small bump of the device, but this is not the normal behavior when bringing the device up to the ear for speech communication. If one closely examines this movement, there are no other natural movements of the device indicating that the user desires to begin speech input to the device. It is therefore the assumption that if the natural movement of bringing the device to the ear is understood and recorded via the sensor in the device, then the needed state change to the speech state may occur. Certain thresholds are allowed that, when exceeded, indicate the precise motion reflecting an ear press when a user raises the mobile device to begin the speech interaction. The detailed description below will describe how the changes to the sensors' data are analyzed and when to determine if a state change has occurred.

When bringing the phone up to the user's ear area, there is a small stopping of the movement followed by a small bouncing effect of the device against the ear area. The bouncing effect may include an initial touching against the ear, a re-touching against the ear, and/or a sliding from one portion of the touch screen against the ear to a second portion of the touch screen against the ear, etc. The 'bouncing effect' will be either in a vertical or lateral plane in relation to the initial movement of the device.

Figure 8:
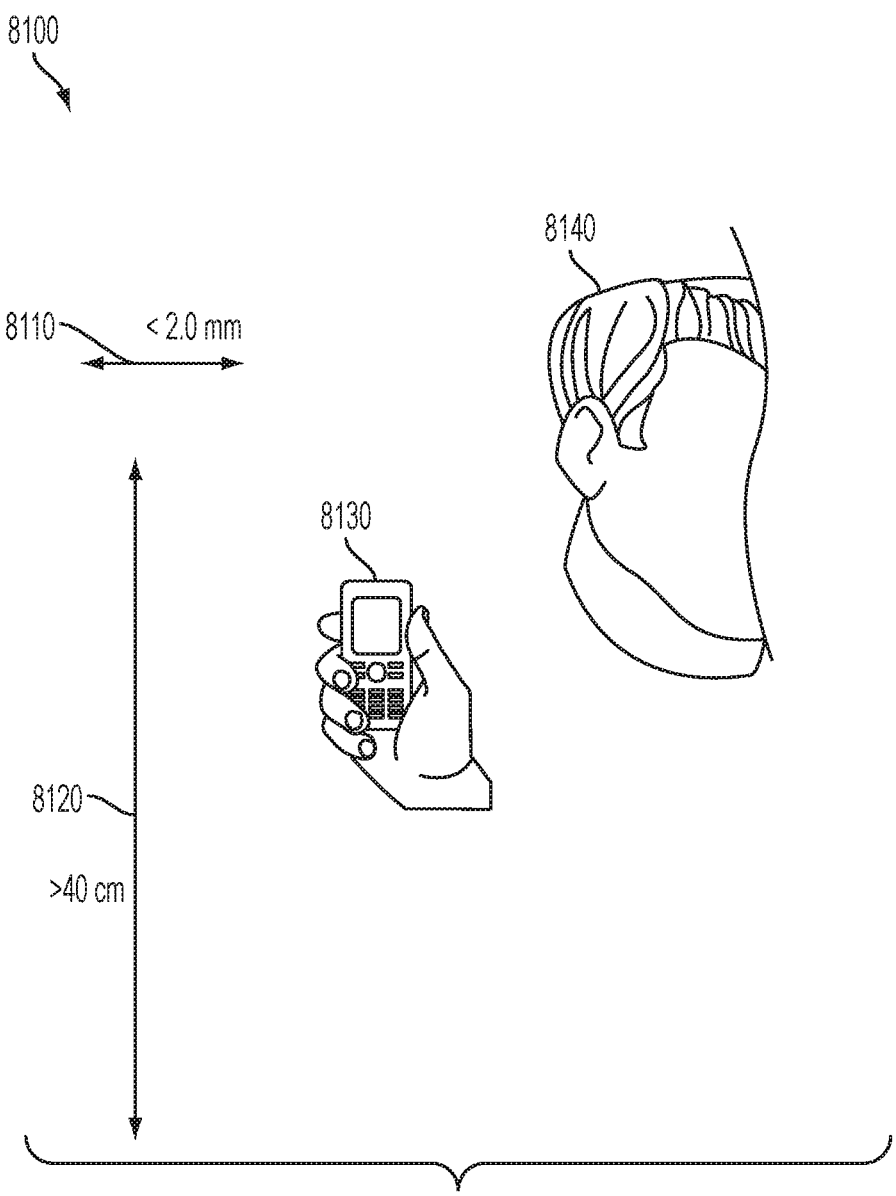
FIG. 8 illustrates an example user initiated wireless device movement diagram of the measurements and corresponding user actions performed to the wireless device, according to example embodiments.

FIG. 8 illustrates the motion of a mobile device used to indicate to the application that a state change to the speech state is appropriate 8100. In FIG. 8, the user of the device 8140 is holding the mobile device 8130. The device is executing an application associated with the present application. The movement of the device towards the user's head, for example, the Y axis 8120 would require movement above a minimum measured distance threshold, for example, 40 cm, referred to hereinafter as the "first movement." Another movement may be identified and require to establish a state change, such as the movement of the device once the device is near the user's ear 8140 would be in other direction(s). For example, the movement of the device may be in the X and/or Z axis movement directions and not to exceed a measured distance, for example, 2.0 mm 8110, hereinafter referred to as the "second movement" compared to a maximum threshold distance.

It is understood that the movement would not necessarily be in a vertical (first movement) and horizontal (second movement) direction, but the movement may be in other planes. For example, if the user is laying down and then brings the device towards the head. Also to consider, is the precise definition of the movement of the device upon or near the ear portion of the head. The motion of the device changes direction once the device nears this area of the user's body. The motion of the device may not be perpendicular to the initial movement, but it is noted that the change in direction for a length not to exceed 2.0 mm may be identified. This direction may indeed be in a perpendicular direction, but not necessarily. Also noted is the movement of the device in a different direction for a length not to exceed 2.0 mm.

Also noted is the understanding that the movement 8110 is made within a fluid timeframe. In more explanatory terms, both movements 8110 and 8120 are made in a single fluid motion. When designing the application to observe the data from the sensor, it is necessary to understand that a time period must be observed to determine how the second movement is related to the first movement. This time period will allow the application to understand that the second movement is indeed related to the first movement and corresponds to the user bringing the device to the ear and the state change to speech state is appropriate. This time period more accurately assures that the movement of the device is indeed the same movement to enable speech state change. For example only, it is understood that the second movement should begin not more than 20/40/60 milliseconds once the first movement is complete. Other time frames to consider are the entire movement time frame used as a time threshold basis for all movements related to call answering operations (e.g., 1, 2, 3 seconds).

The examples of the present application support identification of changes to the sensor(s) included in the mobile device. For example, the accelerometer and data from the sensor(s) are normally reported to the application for processing. For example, in object oriented programming, by utilizing the 'UIAccelerometer' object, a programmer is able to receive values from the accelerometer hardware as the object updates through the use of the 'UIAccelerometerDelegate' protocol, which is a single method for receiving acceleration data from the mobile device. This is a system level method implemented in the operating system running on the mobile device. In a sample pseudocode, the values of the accelerometer are displayed, but one versed in mobile application programming will easily be able to understand the interactions of the accelerometer data and utilize it according to the embodiments of the present application. The application, once receiving the sensor data, can monitor the data for changes that reflect the movement of the device.

Of particular note is the movement of the device upon nearing the user's ear. Understanding that the accelerometer records the data on three different planes (X, Y and Z planes), the data input to the application from the sensor will reflect a change in the movement of the device for a short period of time after the device has travelled for a distance greater than 40 cm, for example. This small indication is assists with the understanding of the exact nature of the movement of the device when the user has placed the device near the ear for speech input.

In the present application, the device is being "bumped" against another object, but the other object is a human ear, not another device. The present application does not need to understand the exact movement of the mobile device, but that a "bump" has occurred. Therefore, it is not necessary to understand either the speed of the moving device or the movement of the device at all before "bumping" into the other device. The only determining factor that there has been a "bump" of the mobile device is that the device moved towards an object and hit that object at some undetermined speed. This may be determined by the measured velocity and the abrupt stop in velocity. Also to be noted, in the present application, the application executing on the mobile device is processing the movement and touch data to perform a state change determination. Using the motion occurring when a user moves the wireless device to the ear, along with the understanding that a small bump occurs, the application of the present application can be aware of the appropriate time to change to a speech state.

In another embodiment of the present application, the device alone does not make the determination of the mobile device having been raised to the ear, but sends the data to a server located in the cloud to make the determination. In this embodiment, the server will receive the notification from the mobile device that a "bump" occurred, but that there was no other device associated with the device in a similar geographic location and at the same exact time. If the "bump" against another object reflects the movement associated with a user pressing the mobile device against an ear, the server will then send a notification back to the mobile device to allow the switching of the state to accept speech. In another embodiment of the present application, the user of the touch screen can enable the application of the mobile device to ascertain with accuracy that the user has brought the device up to the ear.

In computing operations, multi-touch refers to a touch sensing surface's (trackpad or touchscreen) ability to recognize the presence of two or more points of contact with the surface. This plural-point awareness is often used to implement advanced functionality such as pinch to zoom or activating predefined programs that respond to two finger inputs or other multi-touch operations. Multi-touch sensing and processing occurs via an ASIC sensor that is attached to the touch surface.

Furthermore, through an understanding of the programming of mobile devices, it is useful to drive into the technology associated with interfacing with the touch screen data. The pseudocode depicted below reflects programming of the SILVERLIGHT technology and the WINDOWS phone, but one versed in current mobile application programming will easily be able to determine similar methods that can be implemented in other operating systems without deviating from the scope of the present application.

The 'Touch.FrameReported' event serves as an application-level service, providing an underlying touch programming interface. In detail, it can be used to obtain information for each touch point whether in scope of the operating system or the entire application. Touch is a public static class, which only contains a static member, such as the 'FrameReported' event. The code used may include:

```
.namespace
System.Windows.Input
{
  public static class Touch
  {
    public static event TouchFrameEventHandler FrameReported;
  }
}.
```

As can be understood, this event can be subscribed through the 'TouchFrameEventArgs' parameter in the event handler to obtain data. Now, looking at the programming of subscribing to the 'Touch.FrameReported' event, the event subscription in the sample page: TouchPage.xaml, may include:

```
public partial class TouchPage:PhoneApplicationPage
{
  public TouchPage( )
  {
  InitializeComponent( );
  Touch.FrameReported += new TouchFrameEventHandler (Touch_FrameReported);
  }
  void Touch_FrameReported(object sender, TouchFrameEventArgs e)
  {// . . . }
}
```

Continuing to examine the class definition:

```
Public sealed class TouchFrameEventArgs: EventArgs
{
  public int Timestamp {get;}
  public TouchPoint GetPrimaryTouchPoint(UIElement relativeTo);
  public TouchPointCollection GetTouchPoints(UIElement relativeTo);
  public void SuspendMousePromotionUntilTouchUp( );
}.
```

First, the 'GetTouchPoints' method returns a collection of touch points that can be used with multiple fingers to manipulate a smartphone application and at the same time to identify the specific location for each finger. Next, the 'GetPrimaryTouchPoint' method returns the primary touch point for the current frame.

Note the primary touch point refers to the corresponding touch point when you use only one finger to touch the screen. If you use only one finger when you touch the screen, it must be the primary touch point. Consider another case: the first finger is touching the screen while the second finger is placed on the screen. In this case, the second finger isn't the primary touch point. If the user is still placing the second finger on the screen while lifting the first finger and then placing it back on the screen it is no longer the primary touch point. Primary touch point will only appear in the absence of other fingers touching the screen. 'GetPrimaryTouchPoint' and 'GetTouchPoints' both require a parameter of type 'UIElement', both returning information associated with the touch point. Next, looking more closely at the 'TouchPoint' class related definition. The code may include:

```
public sealed class TouchPoint:
DependencyObject
{
  public TouchAction Action {get;}
  public Point Position {get;}
  public Size Size {get;}
  public TouchDevice TouchDevice {get;}
}.
```

TouchPoint is an abstraction of the touching finger across the screen. It provides 4 read-only properties including an Action: of enum type TouchAction, which contains 3 values: Down, Move and Up, a Position: of type Point, which is relative to the upper left corner of the referencing element (i.e., the UIElement parameter in the above-mentioned methodsGetPrimaryTouchPoint or GetTouchPoints). If the parameter passed is in a null, then the resulting position is relative to the upper left corner of the screen (the position may be negative when the incoming value is non-null). Other values may include size: of type size, corresponding to a rectangular area within the touch on the screen. Touch-Device: of type TouchDevice, contains 2 read-only properties: one is Id property (of type integer) to differentiate fingers; the other is the DirectlyOver property of type UIElement, which is the top-level UI element closest to the fingers. Note to distinguish between multiple fingers, the 'Idattribute' may be used. When a particular finger touches the screen, a series of specific events associated with the finger always begin with a down operation followed by the 'move' event, and finally 'up' event. All of these events are associated with the same Id.

Now first, subscribe to the Touch.FrameReported event; second, invoke the GetPrimaryTouchPoint or GetTouchPoints method of the TouchFrameEventArgs parameter in the event handler to obtain the corresponding touch point data. Note the function GetPrimaryTouchPoint returns a TouchPoint while the function GetTouchPoints returns a TouchPointCollection (this collection contains 0 or more TouchPoints). Last, from the TouchPoint corresponding attribute, more detailed information may be obtained. The code may provide:

```
void Touch_FrameReported(object sender, TouchFrameEventArgs e)
{
  StringBuilder sb = new StringBuilder( );
  var primaryPoint = e.GetPrimaryTouchPoint(null);
  if (primaryPoint != null)
  {
sb.Append("Position: X-" + primaryPoint.Position.X.ToString( ) +
" Y- " + primaryPoint.Position.Y.ToString( ) +"\n");
sb.Append("Action: " + primaryPoint.Action.ToString( ) + "\n");
sb.Append("TouchDeviceId:      " +
primaryPoint.TouchDevice.Id.ToString( ) + "\n");
sb.Append("DirectlyOver:     " +
(primaryPoint.TouchDevice.DirectlyOver as FrameworkElement).Name
+ "\n");
sb.Append("Size: Width-" + primaryPoint.Size.Width.ToString( ) +
" Height-" + primaryPoint.Size.Height.ToString( ) + "\n");
  }
  var points = e.GetTouchPoints(null);
  if (points != null)
  {
    foreach (var point in points)
    {
sb.Append("Position: X-" + point.Position.X.ToString( ) + " Y-" +
point.Position.Y.ToString( ) + " " +point.Action.ToString( ) +
"\n");
    }
  }
  textBlock1.Text = sb.ToString( );
}.
```

There are 3 types of information, Down, Move and Up, hidden inside the TouchPoint structure returned in the GetPrimaryTouchPoint method or TouchPointCollection returned in the GetTouchPoints method. In another word, when the user presses and then releases the fingers the FrameReported event will be triggered once respectively, the action information being 'Up' and 'Down', respectively. If the user moves his or her fingers on the screen, then the FrameReported event will be triggered at least 3 times, and the action information being Down, Move, and Up.

Using multi-touch technology, the application is able to detect the press of the top part of the ear pressing against the mobile device. In this embodiment, to detect the movement of the device prior to the pressing of the human ear to the mobile device is not necessary. The pressing of the ear to the mobile device is detected through the use of multi-touch is sufficient to determine that the user has the mobile device up to the ear and thus the application can switch the state of the application to the speech state with certainty.

Figure 9:
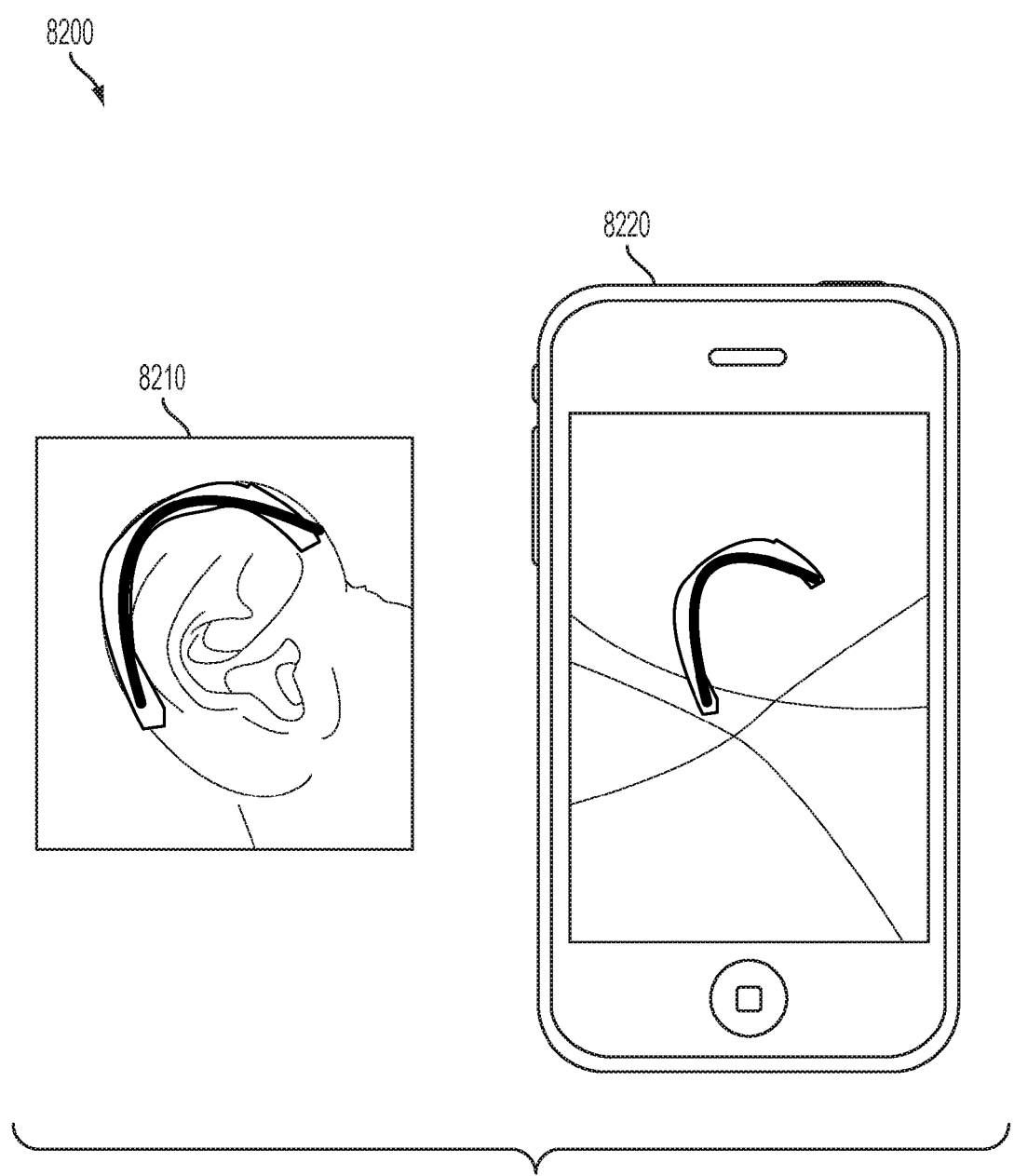
FIG. 9 illustrates an example user ear press sensor reading on a wireless device, according to example embodiments.

FIG. 9 illustrates a depiction of both the human ear and a mobile device as illustrated in 8200. The human ear 8210 is illustrated with the part of the upper ear shaded that will touch the mobile device. When bringing the mobile device up to the ear, it is customary to allow the mobile device to touch the shaded part of the ear. So customary is this action, it is determined through the present application to ascertain with certainty that the user wishes to interact with the mobile device in a speech interaction and have a previous state changed to a speech state.

There is not any other time (normally) when the pressing of the multi-touch screen in this manner will reflect the scenario other than speech interaction with the mobile device. Therefore it is appropriate to assume that if the mobile device's touch screen has indicated that this pattern is reflected on the screen, the user has the ear pressed against the mobile device. There may be other parts of the ear touching the screen outside the noted shaded portions of the ear, but what is shaded is the minimal part of the ear that will reflect that the ear is pressed against the ear. Also depicted in FIG. 9 is the mobile device 8220. This mobile device has a similar area shaded as noted in the shading of the human ear 8210. The application will be receiving data from the touch screen through the registering of the data through the authentication portion of the application. Once the application receives the data from the touch screen, verification can be made as to the type of touch that is occurring on the screen. If the multi-touch reflects points that are reflective of the ear touch 8220, then it can be assured that the user has the mobile device up to the ear and can safely switch to the speech state.

The point at which the ear multi-touches the touch screen may move up or down as related to the shaded portion of the touchscreen 8210, depending on how the user habitually places the mobile device 8220 to the ear. The shaded portion of the touchscreen 8210 serves only to depict a sample of the top portion of the user's ear if he/she places the center of the mobile phone directly over the center of the ear.

Figure 10:
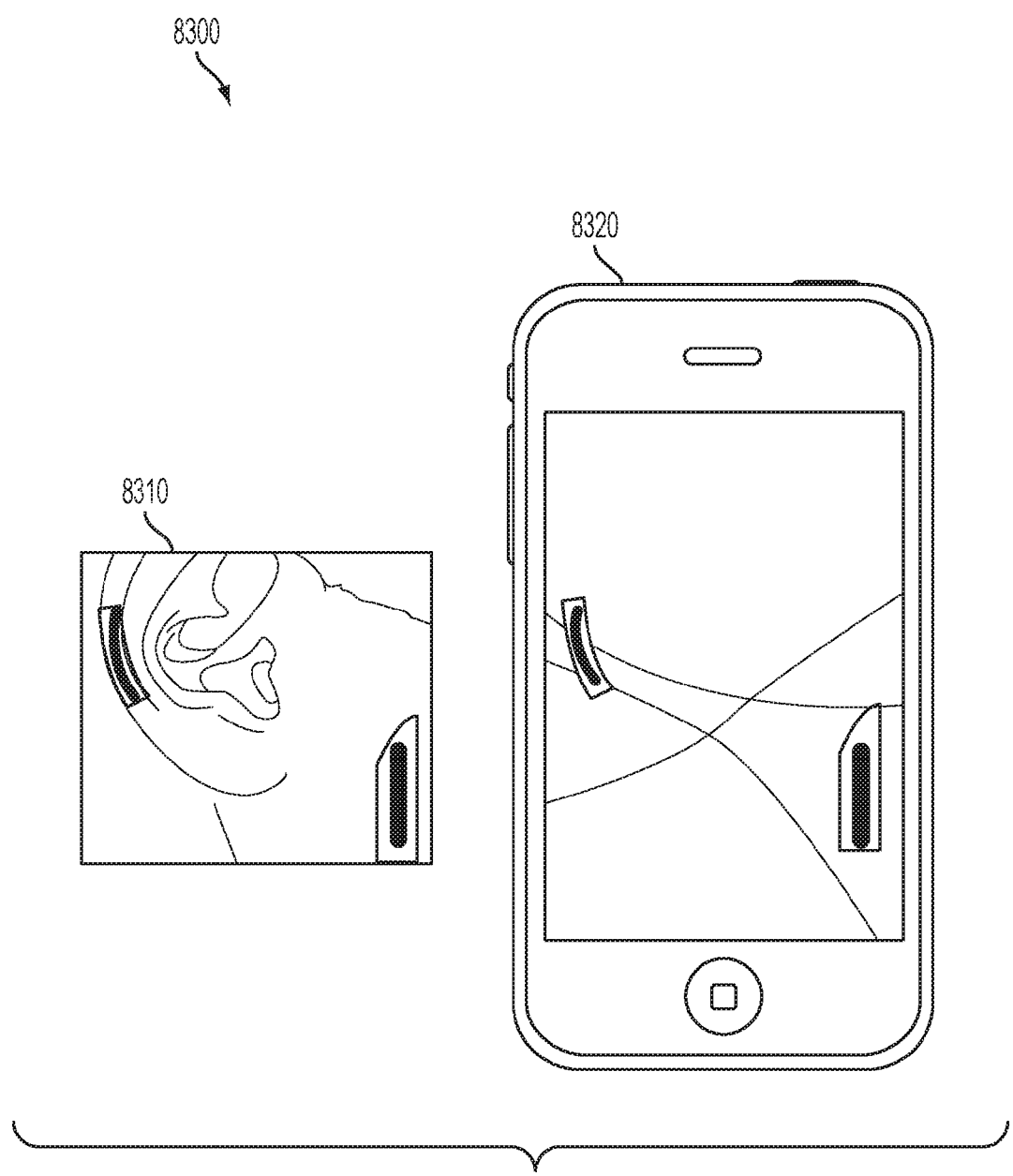
FIG. 10 illustrates another example user ear press sensor reading on a wireless device, according to example embodiments.

FIG. 10 depicts another graphic depiction of the human ear and a mobile device 8300. This figure includes shaded parts of the human ear 8310 wherein the user's ear touches the mobile device in more than one place (i.e., multi-touch). Also depicted are the parts of the mobile device's touchscreen 8320 where the same portions of the ear create multi-touches with the touchscreen. In this example, a partial section of the outer ear has touched the screen, as well as a portion of the user's cheek near the ear. It is therefore surmised that there are a number of points of the human ear and cheek where the touchscreen can be touched when a user has brought the mobile device to the ear in the attempt to make or receive a voice call. This description and associated depictions serve only to bring to the reader's attention the possible solutions and bring to light an overall solution without depicting exact data points and algorithms that may be utilized in implementing the functionality.

Figure 11:
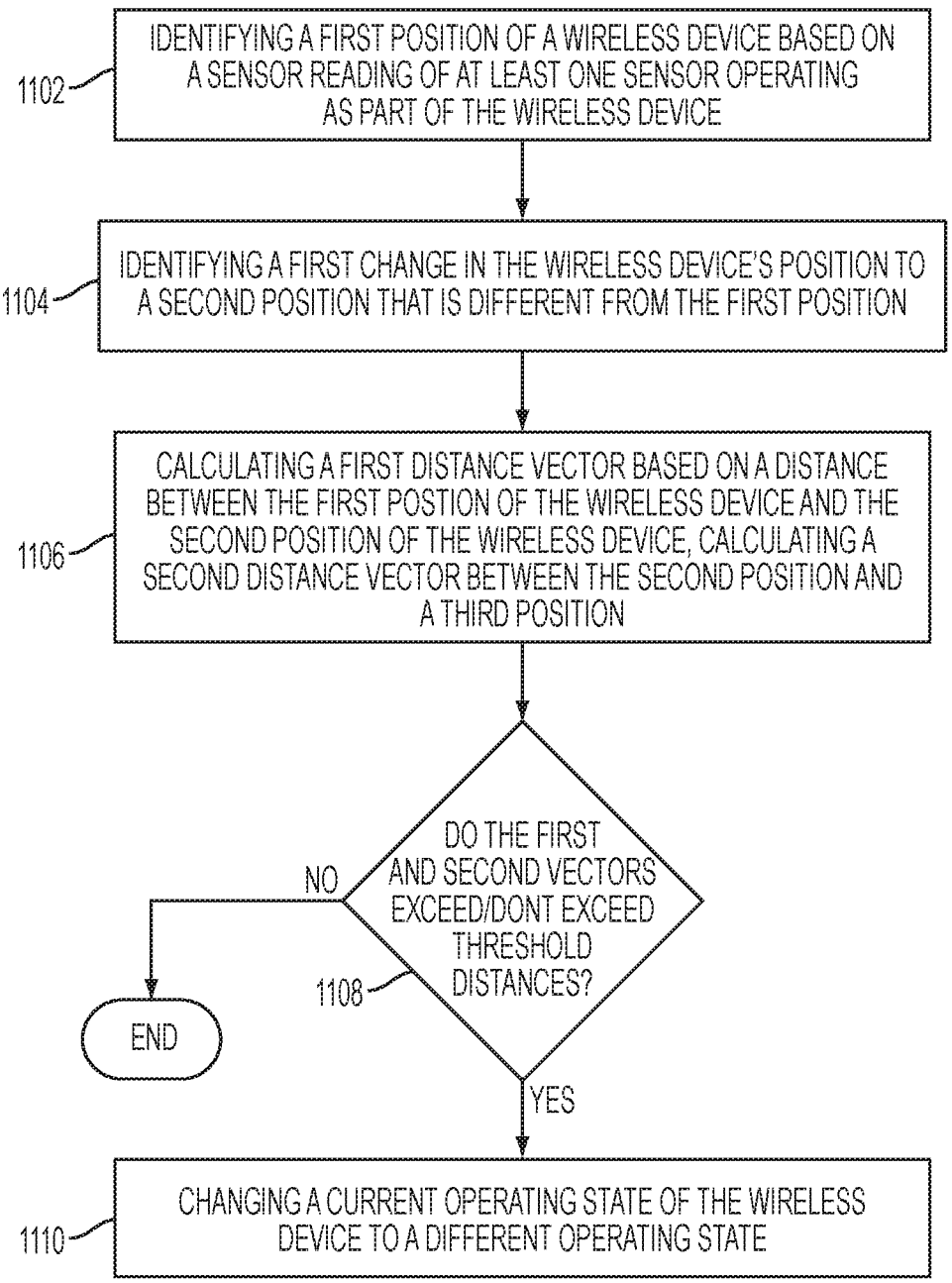
FIG. 11 illustrates an example flow diagram, according to example embodiments.

FIG. 11 illustrates a flow diagram according to one example embodiment of the present application. Referring to FIG. 11, an example method of operation according to example embodiments may provide identifying a first position of a wireless device based on a sensor reading of at least one sensor operating as part of the wireless device at operation 1102 and storing first position data corresponding to the first position in a memory. The method may also include identifying a first change in the wireless device's position to a second position that is different from the first position at operation 1104. The method may also include storing second position data corresponding to the second position in the memory. The method may also include calculating a first distance vector based on a distance between the first position of the wireless device and the second position of the wireless device, the distance vector having a corresponding first direction associated with a first direction of movement of the wireless device at operation 1106. The method may also provide comparing the first distance vector to a first threshold distance stored in the memory to confirm the first distance vector exceeds a first minimum distance at operation 1108. The method may further provide identifying a second change in the wireless device's position to a third position that is different from the first position and the second position, and storing third position data corresponding to the third position in the memory. Similar to the above-operation, a second distance vector is calculated based on a distance between the second position of the wireless device and the third position of the wireless device, the second distance vector having a corresponding second direction associated with a second direction of movement of the wireless device. The method may then provide comparing the second distance vector to a second threshold distance stored in the memory to confirm the second distance vector does not exceed a first maximum distance at operation 1108 and changing a current operating state of the wireless device to a different operating state if the first distance vector exceeds the first minimum distance and the second distance vector does not exceed the first maximum distance at operation 1110.

Figure 12:
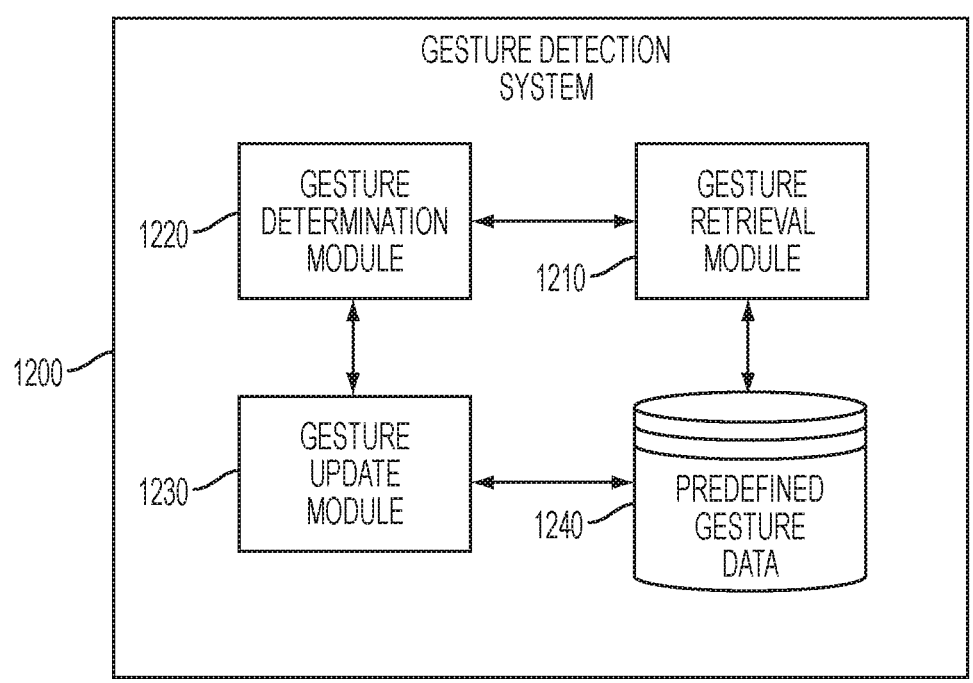
FIG. 12 illustrates an example system configuration according to example embodiments.

FIG. 12 illustrates a system diagram of an example system configured to perform a set of operations corresponding to one example embodiment of the present application. The system may be a server, computer, smartphone or any hardware device configured with memory, a processor and an operating system. Referring to FIG. 12, one example method of operation conducted by the gesture detection system 1200 may include identifying a first position of a wireless device based on a sensor reading of a sensor operating as part of the wireless device. The sensors may be based on an accelerometer or gyroscope chip or related hardware device stored inside the wireless device. The change in position may be stored as first position data corresponding to the first position in a memory, such as database 1240. The method may further provide identifying a change in the wireless device's position to a second position that is different from the first position indicating that a gesture is taking place. That second position data may also be stored in the database 1240. The method may also include storing second position data corresponding to the second position in the memory and receiving a specific pattern of touch input data on a touch pad of the wireless device, the specific pattern of touch input data is identified as a predefined object which corresponds to the dimensions of a human ear being pressed against the touch pad. The predefined gesture data 1240 may be used to reference the human ear by its dimensions and the input from the touch pad. The data may reference from a predefined template for both the human ear pattern detected and the movement angles, velocity, distance, time frame and other related information received. The touch pad may include any part of the wireless device that can receive information when engaged with any object such as a human finger, ear, or other appendage.

The gesture retrieval module 1210 may retrieve a predefined template of human movement gestures, human ear data, etc. from the predefined gesture data database 1240. The gesture determination module 1220 may compare the received data to the predefined data to process the first position data, the second position data and the specific pattern of touch input data to create a set of gesture data for comparing the set of gesture data to the predefined set of gesture data stored in the memory 1240 to identify whether a predefined wireless device operation has occurred. If so, the predefined wireless device operation will be identified as having occurred and a current operating state of the wireless device will be changed to a different operating state (e.g., from idle to active). Any updates to the predefined gesture data 1240 or history data may be kept in storage as provided by the update module 1230.

Additional operation performed by the system 1200 may include identifying a bouncing movement associated with the touch input data, the bouncing movement effect may include an initial touching against the human ear and a re-touching against the human ear and/or a sliding touch movement from one portion of the touch pad against the human ear to a second portion of the touch pad against the human ear. This example constitutes the bouncing phenomenon that may occur when a person places a phone to their ear to answer an incoming call. Also, the system may further perform identifying a multi-touch event by identifying at least two touch points on the touch pad of the wireless device at the same time or contemporaneously at two different areas on the touch pad plane. At least one of the two touch points is part of the human ear and the other may be a different part of the human ear, part of the cheek, face, neck, etc. The system may also perform receiving data via the wireless device from a base station and generating a notification on the wireless device responsive to receiving the data, such as a ringing alert or other alert. The change in the wireless device's position may be determined after the notification has been generated. The data received may be a telephone call, an email, a voicemail, a short message service (SMS) message.

The notification may be an audible message indicator, an audible telephone ringing indicator, a silent message indicator and a silent telephone ringing indicator. The example method of operation performed by the system may also include identifying the second position as being within a threshold distance of the first position, and comparing the difference between the first position data and the second position data to a predefined human arm movement vector stored in the memory 1240. The method may also include determining that the difference between the first position data and the second position data corresponds to a predefined human arm movement vector associated with answering an incoming call to the wireless device and identifying the specific pattern of touch input data as being similar to a predefined human ear touch pattern by comparing dimensions of the specific pattern of touch input data to a predefined human ear touch pattern stored in the memory. Also, the changing the current operating state of the wireless device to the different operating state may include changing an idle operating state to a voice receptive call answering operating state.

Another example embodiment of the present application may provide a method that includes identifying a first position of a wireless device based on a sensor reading of at least one sensor operating as part of the wireless device, storing first position data corresponding to the first position, identifying a first change in the wireless device's position to a second position that is different from the first position, storing second position data corresponding to the second position in the memory and calculating a first distance vector based on a distance between the first position of the wireless device and the second position of the wireless device. The distance vector has a corresponding first direction associated with a first direction of movement of the wireless device.

Once the distance vector is determined, it may be compared to a first threshold distance stored in the memory to confirm the first distance vector exceeds a first minimum distance. For example, it may be necessary to confirm that the user has moved his or her arm a minimum distance while holding the mobile device to confirm that a call answering operation is taking place based on the user's gestures and movements. Also, the method may also include identifying a second change in the wireless device's position to a third position that is different from the first position and the second position and storing third position data corresponding to the third position in the memory. The second distance vector may then be calculated based on a distance between the second position of the wireless device and the third position of the wireless device. The second distance vector will also have a corresponding second direction associated with a second direction of movement of the wireless device. Now, the second distance vector may be compared to a second threshold distance stored in the memory to confirm the second distance vector does not exceed a first maximum distance. For instance, the user moving the device from a raised position to a near ear or ear touching position may only be permitted to be less than a certain distance to ensure the user is moving the device towards an ear and not performing a different operation. As a result, a current operating state of the wireless device may be changed to a different operating state if the first distance vector exceeds the first minimum distance and the second distance vector does not exceed the first maximum distance.

The system may also perform identifying a specific pattern of touch input data identified as a predefined object being pressed against a touch pad sensor of the wireless device, the predefined object may have a corresponding surface area and corresponding to dimensions of a human ear. The touch may be interpreted as having a particular surface area, length, pattern, etc., as measured from the touch pad of the wireless device. This data may be compared to the dimensions of the specific pattern of touch input data of a predefined human ear touch pattern stored in the memory.

The determination module 1220 may now calculate whether the specific pattern of touch input data corresponds to at least a minimum predefined sub-region of a total surface area of the predefined human ear touch pattern stored in the memory. The sub-region may be part of a total region defined by the template or model ear data stored in the memory. The specific pattern of touch input data may include at least two separate touch points on the touch pad sensor each having a corresponding surface area that together make up the minimum predefined sub-region.

The gesture detection system 1200 may now determine whether the first change in the wireless device's position and the second change in the wireless device's position occurred within a specified time frame (e.g., 10 ms, 100 ms, 1 second, etc.), and if so, then the current operating state of the wireless device may be changed to a different operating state (e.g., from idle to talk via a live call).

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 13 illustrates an example network element 1300, which may represent any of the above-described network components, etc.

Figure 13:
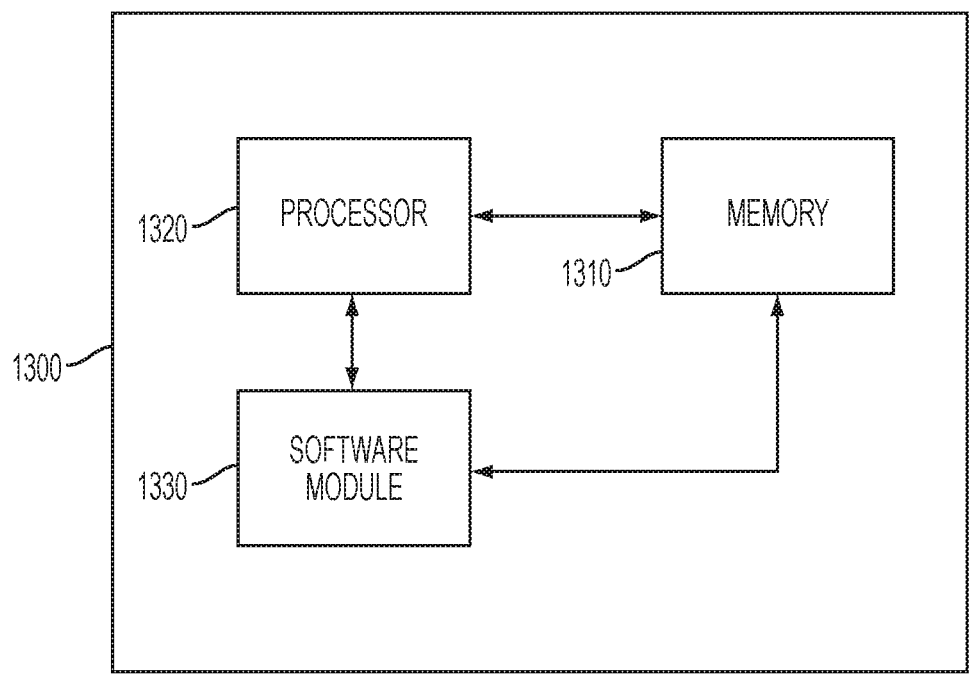
FIG. 13 illustrates an example network entity device configured to store instructions, software, and corresponding hardware for executing the same, according to example embodiments.

As illustrated in FIG. 13, a memory 1310 and a processor 1320 may be discrete components of the network entity 1300 that are used to execute an application or set of operations. The application may be coded in software in a computer language understood by the processor 1320, and stored in a computer readable medium, such as, the memory 1310. The computer readable medium may be a non-transitory computer readable medium that includes tangible hardware components in addition to software stored in memory. Furthermore, a software module 1330 may be another discrete entity that is part of the network entity 1300, and which contains software instructions that may be executed by the processor 1320. In addition to the above noted components of the network entity 1300, the network entity 1300 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:
1. A method, comprising:
    storing a first position of a wireless device in a memory;
    identifying a first change in the wireless device's position to a second position that is different from the first position;
    storing second position data corresponding to the second position in the memory;
    calculating a first distance vector based on a distance between the first position of the wireless device and the second position of the wireless device;

comparing the first distance vector to a first threshold distance stored in the memory to confirm the first distance vector exceeds a first minimum distance;

identifying a second change in the wireless device's position to a third position that is different from the first position and the second position;

storing third position data corresponding to the third position in the memory;

calculating a second distance vector based on a distance between the second position of the wireless device and the third position of the wireless device;

comparing the second distance vector to a second threshold distance stored in the memory to confirm the second distance vector does not exceed a first maximum distance; and changing a current operating state of the wireless device to a different operating state if the first distance vector exceeds the first minimum distance and the second distance vector does not exceed the first maximum distance.

2. The method of claim 1, further comprising:

identifying a specific pattern of touch input data identified as a predefined object being pressed against a touch pad sensor of the wireless device, the predefined object having a corresponding surface area and corresponding to dimensions of a human ear; and comparing dimensions of the specific pattern of touch input data to a predefined human ear touch pattern stored in the memory.

3. The method of claim 2, further comprising:

calculating whether the specific pattern of touch input data corresponds to at least a minimum predefined sub-region of a total surface area of the predefined human ear touch pattern stored in the memory;

wherein the specific pattern of touch input data comprises at least two separate touch points on the touch pad sensor each having a corresponding surface area that together comprise the minimum predefined sub-region.

4. The method of claim 1, further comprising:

determining whether the first change in the wireless device's position and the second change in the wireless device's position occurred within a specified time frame; and if so, then permitting the current operating state of the wireless device to change to the different operating state of the wireless device.

5. The method of claim 1, further comprising:

receiving data via the wireless device from a base station; and generating a notification on the wireless device responsive to receiving the data, and wherein the first change in the wireless device's position and the second change in the wireless device's position occurred after the notification has been generated.

6. The method of claim 5, wherein the data is at least one of a telephone call, an email, a voicemail, and a short message service (SMS) message.

7. The method of claim 5, wherein the notification is at least one of an audible message indicator, an audible telephone ringing indicator, a silent message indicator and a silent telephone ringing indicator.

8. A wireless device, comprising:

a memory;

a processor configured to store a first position of the wireless device in the memory, identify a first change in the wireless device's position to a second position that is different from the first position, store second position data corresponding to the second position in the memory, calculate a first distance vector based on a distance between the first position of the wireless device and the second position of the wireless device, compare the first distance vector to a first threshold distance stored in the memory to confirm the first distance vector exceeds a first minimum distance, identify a second change in the wireless device's position to a third position that is different from the first position and the second position, store third position data corresponding to the third position in the memory, calculate a second distance vector based on a distance between the second position of the wireless device and the third position of the wireless device, compare the second distance vector to a second threshold distance stored in the memory to confirm the second distance vector does not exceed a first maximum distance, and change a current operating state of the wireless device to a different operating state if the first distance vector exceeds the first minimum distance and the second distance vector does not exceed the first maximum distance.

9. The wireless device of claim 8, wherein the processor is further configured to:

identify a specific pattern of touch input data identified as a predefined object being pressed against a touch pad sensor of the wireless device, the predefined object having a corresponding surface area and corresponding to dimensions of a human ear; and compare dimensions of the specific pattern of touch input data to a predefined human ear touch pattern stored in the memory.

10. The wireless device of claim 9, wherein the processor is further configured to calculate whether the specific pattern of touch input data corresponds to at least a minimum predefined sub-region of a total surface area of the predefined human ear touch pattern stored in the memory, and wherein the specific pattern of touch input data comprises at least two separate touch points on the touch pad sensor each having a corresponding surface area that together comprise the minimum predefined sub-region.

11. The wireless device of claim 8, wherein the processor is further configured to determine whether the first change in the wireless device's position and the second change in the wireless device's position occurred within a specified time frame, and if so, then permitting the current operating state of the wireless device to change to the different operating state of the wireless device.

12. The wireless device of claim 8, further comprising a receiver configured to receive data from a base station and generate a notification on the wireless device responsive to receiving the data, and wherein the first change in the wireless device's position and the second change in the wireless device's position occurred after the notification has been generated.

13. The wireless device of claim 12, wherein the data is at least one of a telephone call, an email, a voicemail, and a short message service (SMS) message.

14. The wireless device of claim 12, wherein the notification is at least one of an audible message indicator, an audible telephone ringing indicator, a silent message indicator and a silent telephone ringing indicator.

15. A non-transitory computer readable storage medium configured to store instructions that when executed cause a processor to perform:

storing a first position of a wireless device in a memory;

identifying a first change in the wireless device's position to a second position that is different from the first position;

storing second position data corresponding to the second position in the memory;

calculating a first distance vector based on a distance between the first position of the wireless device and the second position of the wireless device;

comparing the first distance vector to a first threshold distance stored in the memory to confirm the first distance vector exceeds a first minimum distance;

identifying a second change in the wireless device's position to a third position that is different from the first position and the second position;

storing third position data corresponding to the third position in the memory;

calculating a second distance vector based on a distance between the second position of the wireless device and the third position of the wireless device;

comparing the second distance vector to a second threshold distance stored in the memory to confirm the second distance vector does not exceed a first maximum distance; and changing a current operating state of the wireless device to a different operating state if the first distance vector exceeds the first minimum distance and the second distance vector does not exceed the first maximum distance.

16. The non-transitory computer readable storage medium of claim 15, wherein the processor is further configured to perform:

identifying a specific pattern of touch input data identified as a predefined object being pressed against a touch pad sensor of the wireless device, the predefined object having a corresponding surface area and corresponding to dimensions of a human ear; and comparing dimensions of the specific pattern of touch input data to a predefined human ear touch pattern stored in the memory.

17. The non-transitory computer readable storage medium of claim 16, wherein the processor is further configured to perform:

calculating whether the specific pattern of touch input data corresponds to at least a minimum predefined sub-region of a total surface area of the predefined human ear touch pattern stored in the memory;

wherein the specific pattern of touch input data comprises at least two separate touch points on the touch pad sensor each having a corresponding surface area that together comprise the minimum predefined sub-region.

18. The non-transitory computer readable storage medium of claim 15, wherein the processor is further configured to perform:

determining whether the first change in the wireless device's position and the second change in the wireless device's position occurred within a specified time frame; and if so, then permitting the current operating state of the wireless device to change to the different operating state of the wireless device.

19. The non-transitory computer readable storage medium of claim 15, wherein the processor is further configured to perform:

receiving data via the wireless device from a base station; and generating a notification on the wireless device responsive to receiving the data, and wherein the first change in the wireless device's position and the second change in the wireless device's position occurred after the notification has been generated.

20. The non-transitory computer readable storage medium of claim 15, wherein the data is at least one of a telephone call, an email, a voicemail, and a short message service (SMS) message, and wherein the notification is at least one of an audible message indicator, an audible telephone ringing indicator, a silent message indicator and a silent telephone ringing indicator.

* * * * *